No. 882,373. PATENTED MAR. 17, 1908.
H. E. CARTER.
ANIMAL TRAP.
APPLICATION FILED AUG. 15, 1907.
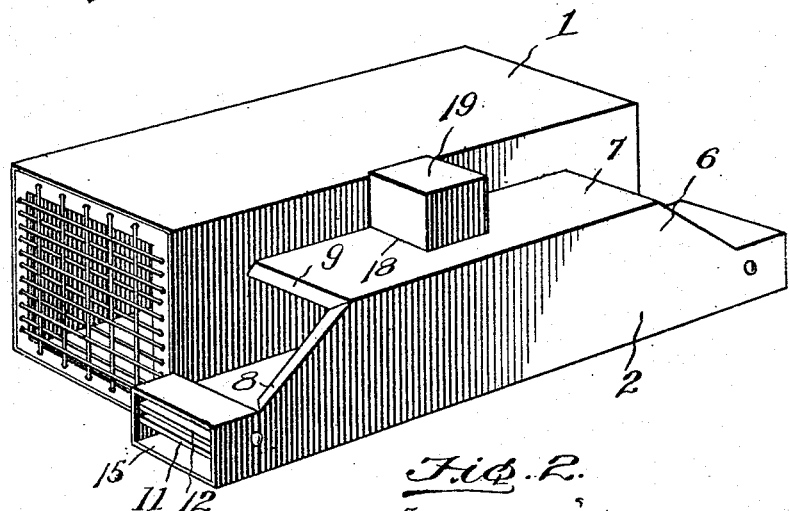
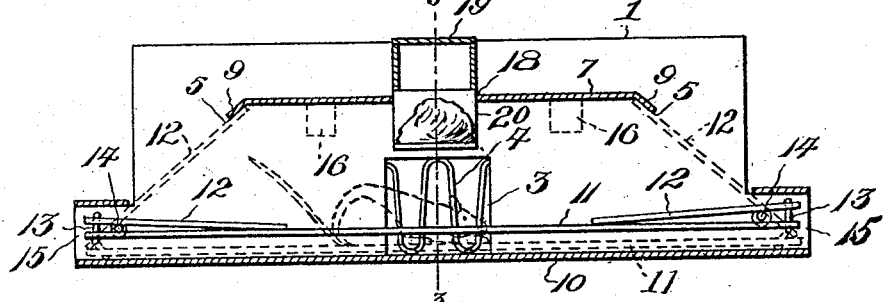
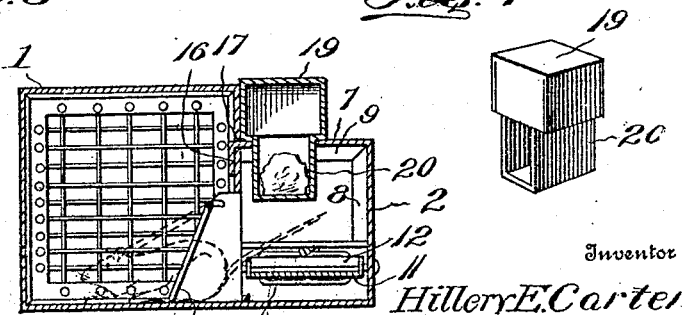
Inventor
Hillery E. Carter
By Victor J. Evans
Attorney
Witnesses
J. T. L. Wright
Wm. Bagger

UNITED STATES PATENT OFFICE.

HILLERY E. CARTER, OF BROOKLYN, IOWA.

ANIMAL-TRAP.

No. 882,373.          Specification of Letters Patent.          Patented March 17, 1908.

Application filed August 15, 1907. Serial No. 388,664.

*To all whom it may concern:*

Be it known that I, HILLERY E. CARTER, a citizen of the United States, residing at Brooklyn, in the county of Poweshiek and State of Iowa, have invented new and useful Improvements in Animal-Traps, of which the following is a specification.

This invention relates to that class of animal traps which are self-setting; that is to say, in which the victim, on entering into the cage compartment of the trap, leaves the trap reset for the next victim.

The object of the invention is to simplify and improve the construction and operation of this class of devices.

With these and other ends in view which will readily appear as the nature of the invention is better understood, the same consists in the improved construction and novel arrangement and combination of parts which will be hereinafter fully described and particularly pointed out in the claims.

In the accompanying drawing has been illustrated a simple and preferred form of the invention; it being, however, understood that no limitation is necessarily made to the precise structural details therein exhibited, but that changes, alterations and modifications within the scope of the invention may be resorted to when desired.

In the drawing, Figure 1 is a perspective view of an animal trap constructed in accordance with the invention. Fig. 2 is a longitudinal sectional view of the same. Fig. 3 is a vertical transverse sectional view taken on the plane indicated by the line 3—3 in Fig. 2. Fig. 4 is a perspective detail view of the bait box, detached.

Corresponding parts in the several figures are denoted by like characters of reference.

The improved trap comprises a box or cage 1 and an entrance compartment 2, the latter extending longitudinally adjacent to one side of the cage with which it is connected through a doorway or aperture 3 in one of the side walls of the cage; said doorway being provided with a gravity door or gate 4 opening into the cage.

The inlet compartment consists of a longitudinal passage provided at the ends thereof with inclined or obliquely disposed doorways 5 adjacent to which the outer wall 6 and the top 7 of the inlet compartment are provided with flanges designated respectively 8 and 9.

The inlet compartment is provided with a false floor, supported above the permanent floor 10, and said false floor includes a vertically movable flooring strip 11 and doors 12—12 that are hingedly connected with the ends of said flooring strip by means of links 13 which, while they permit the doors to swing freely in an upward direction, also space the said doors slightly from the flooring strip. At the ends of the inlet compartment, adjacent to the doorways 5 are transversely disposed rods 14 supporting the doors 12 which latter will normally gravitate to the position shown in full lines in Fig. 2 whereby it will be seen that the free ends or edges of said doors normally rest upon the flooring strip, the latter being supported in an elevated position by the weight of the doors. When sufficient weight, such as that of an animal is imposed upon the flooring strip, at a point intermediate the doors, the flooring strip will be depressed and the doors 12 will swing upward to the position indicated in dotted lines, the upward movement of the doors being limited by the flanges 8 and 9 adjacent to the doorways. The ends of the entrance compartment are preferably provided with recesses 15 for the accommodation of the free ends of the flooring strip, the hinged ends of the doors and the transverse supporting rods 14.

Under the construction illustrated in the drawings, the top 7 of the entrance compartment is provided with lips or tongues 16 extending through appropriate slots 17 in the adjacent wall of the cage box, said lips being bent downward, as shown, to effect the desired connection of the parts; this construction is deemed convenient and appropriate when the device is made of sheet metal, which is the material preferably employed in the construction.

The top 7 of the entrance compartment is provided intermediate the ends thereof with a slot or aperture 18 for the reception of the bait box 19 which includes a downward extending U-shaped supporting portion 20, having open ends, and upon which bait may be placed; this construction enables the bait box to be readily detached for the placing of the bait, and the latter will be exposed in a suitable position intermediate the doors of the inlet compartment.

The operation and advantages of this invention will be readily understood from the foregoing description when taken in connection with the drawings hereto annexed.

When a victim enters the entrance compartment through the doorway at either end of said compartment, the weight imposed upon the flooring strip 11 will depress the latter and cause the doors 12 to swing upward until arrested by engagement with the flanges 8 and 9; the only outlet, then, will be through the doorway leading into the cage compartment, and when the victim enters said compartment the flooring strip 11 will be relieved from the weight, thus permitting the doors 12 to swing downward to the initial or normal position, leaving the trap set for the reception of the next victim.

Having thus fully described the invention, what is claimed as new is:—

1. In a trap, an inlet compartment consisting of a passage having doorways at the ends thereof, a vertically movable flooring strip, transversely disposed supporting rods adjacent to the lower edges of the doorways, doors supported loosely upon the rods, and links connecting the doors with the ends of the flooring strip.

2. In a trap, a cage box provided with a doorway an entrance compartment consisting of a longitudinal passage adjacent to the cage box and communicating therewith through the doorway, a gravity gate closing the doorway of the cage box, said entrance compartment having doorways at the ends thereof, supporting rods adjacent to the lower edges of the doorways of the entrance compartment, doors supported loosely upon the rods, a flooring strip extending the full length of the entrance compartment, and links connecting the doors with the ends of the flooring strip.

3. In a trap, a cage box, an entrance compartment consisting of a longitudinal passage adjacent to said box and having doorways at the ends thereof, means for obstructing the doorways and a bait box supported intermediate the doorways and having a U-shaped open ended supporting member.

4. In a trap, a cage box provided with a doorway an entrance compartment consisting of a longitudinal passage adjacent to the cage box and communicating therewith through the doorway, said compartment having doorways at the ends thereof, and a top piece provided with a slot or aperture intermediate the doorways, a gravity gate closing the doorway of the cage box, and a bait box supported upon the top of the entrance compartment and having a U-shaped supporting member adapted to extend through the slot or aperture therein.

5. In a trap, a cage box provided with a doorway, an entrance compartment consisting of a longitudinal passageway adjacent to the cage, means formed in the top of the entrance compartment for connecting the latter to the cage box, flanges formed on the top and sides of the entrance compartment, a vertically movable flooring strip, doors hingedly connected with the ends of the flooring strip and door supporting rods disposed transversely adjacent to the lower edges of the doorway.

In testimony whereof I affix my signature in presence of two witnesses.

HILLERY E CARTER.

Witnesses:
J. A. BARNES,
A. B. TALBOTT.